United States Patent [19]
Lin

[11] Patent Number: 5,164,082
[45] Date of Patent: Nov. 17, 1992

[54] WATER FILTER HAVING LEVER CONTROLLED PLUNGER

[76] Inventor: Tzu-Fu Lin, 5F., No. 12, Lane 178, Sec. 1, Li Hsing Rd., Sanchung, Taipei Hsien, Taiwan

[21] Appl. No.: 808,760

[22] Filed: Dec. 17, 1991

[51] Int. Cl.$^5$ .................... B01D 27/08; B01D 35/157
[52] U.S. Cl. .................... 210/238; 210/287;
210/421; 210/422; 210/425; 210/429; 210/456;
210/458; 210/460; 210/470; 210/492; 137/562;
137/625.23
[58] Field of Search ............ 210/232, 234, 236, 237,
210/238, 263, 264, 282, 287, 416.3, 418, 420,
421, 422, 424, 425, 429, 435, 440, 443, 456, 458,
460, 461, 470, 492, 497.01, 508; 137/549, 562,
625.16, 625.22, 625.23, 625.47

[56] References Cited

U.S. PATENT DOCUMENTS

| | | | |
|---|---|---|---|
| 4,172,796 | 10/1979 | Corder | 137/625.47 |
| 4,504,389 | 3/1985 | Rundzaitis | 210/282 |
| 4,556,484 | 12/1985 | Hunter et al. | 210/416.3 |
| 4,770,768 | 9/1988 | Lang | 210/424 |
| 4,980,073 | 12/1990 | Woodruff | 210/424 |
| 5,017,286 | 5/1991 | Heiligman | 210/424 |

Primary Examiner—Robert A. Dawson
Assistant Examiner—W. L. Millard
Attorney, Agent, or Firm—Verndell Legal Group

[57] ABSTRACT

A water filter comprising a hollow cylindrical base, a filter assembly fastened in said base at the top which is comprised of an inner filter tube covered with a braided outer filter tube, a cylindrical casing covered on said filter assembly and attached to said base at the top, a ater outlet pipe connected to said base at the bottom, a water intake pipe and a drain pipe respective connected to said base, a plunger fastened in a cylindrical hole inside said base and rotated by a lever, wherein said plunger has a plurality of water passage holes alternatively rotated by said lever to let an intake flow of water from said water intake pipe: (a) flow toward said water outlet pipe directly; (b) flow through said filter assembly to said water outlet pipe (c) flow through the space between said inner filter tube and said outer filter tube and then, penetrate through said outer filter tube toward said drain pipe; (d) flow into the space between said outer filter tube and said cylindrical casing and penetrate through said outer filter tube and then, flow toward said drain pipe; or (e) be stopped from flowing through said base.

4 Claims, 9 Drawing Sheets

WATER FILTER HAVING LEVER CONTROLLED PLUNGER

BACKGROUND OF THE INVENTION

The present invention relates to water filters and relates more particularly to such a water filter which has a plunger fastened in the housing thereof and controlled by a lever to change the direction of an intake flow permitting it to be filtrated by a filter assembly or guided to a water outlet pipe directly, or causing it to wash or backwash said filter assembly.

Several water filter devices have been known and used in filtering city water. If a water filter is used in filtering city water, its filter element must be regularly cleaned or replaced so that a satisfactory filtering effect can be constantly obtained. However, it is not an easy job to wash or replace the filter element of a water filter. Further, while washing a water filter, the flow or washing water passes through the same water passage way as the filtrate does. Therefore, the flow of washing water which carries impurities out of the filter element may contaminate the piping of the water filter again.

SUMMARY OF THE INVENTION

The present invention has been accomplished under the aforesaid circumstances. It is therefore an object of the present invention to provide a water filter which has means controlled by a lever to guide an intake flow of water for washing or backwashing a filter assembly therein. It is another object of the present invention to provide a water filter which has a separate drain port for drawing off a washing or backwashing flow of water which passes through the filter assembly therein. It is still another object of the present invention to provide a water filter which is simple in structure and inexpensive and has all water passage ways concealed from the sight.

DETAILED DESCRIPTION OF THE PREFERRED EMBODIMENT

Figure 1:
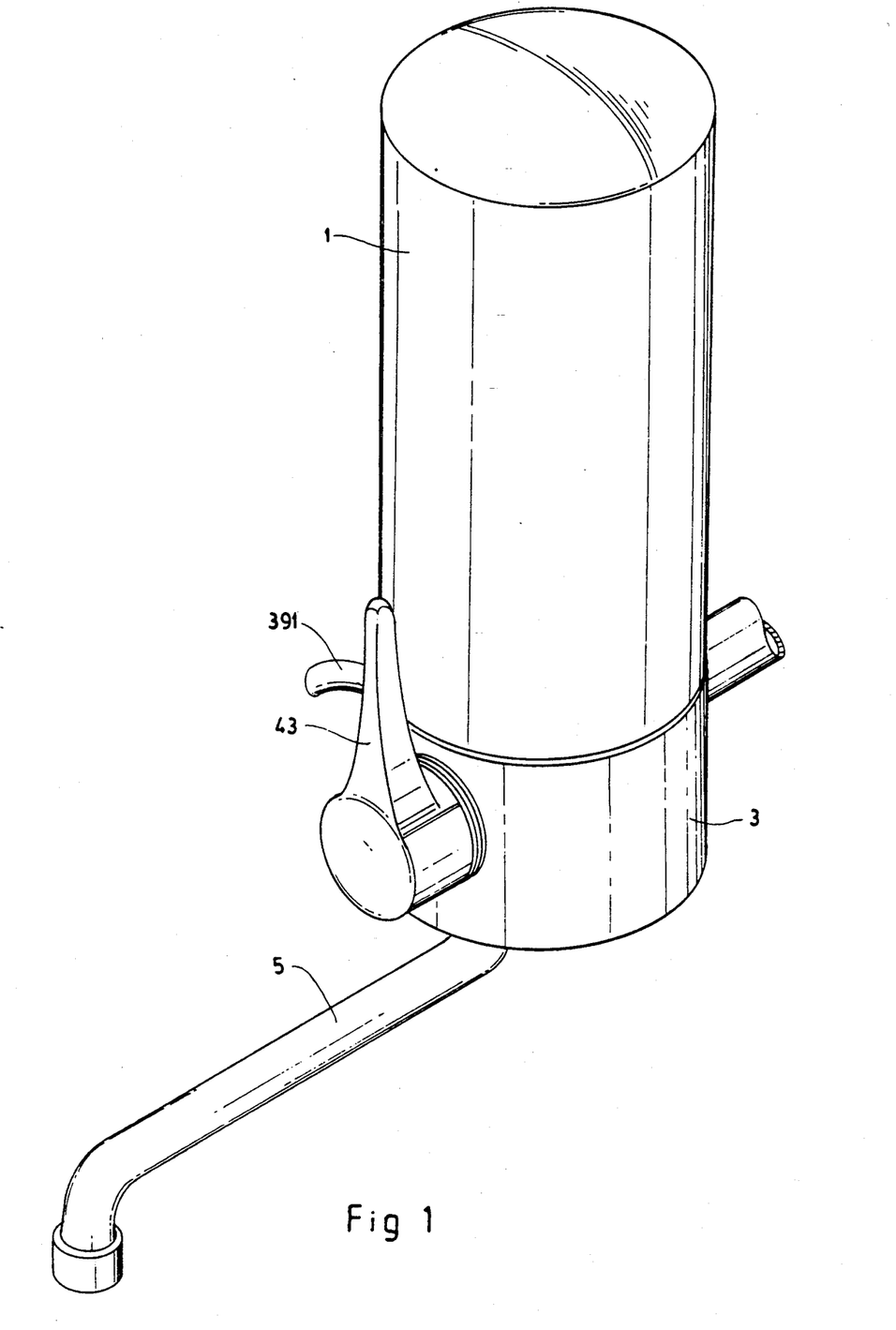
FIG. 1 is a perspective view of a water filter embodying the present invention.
Figure 2:
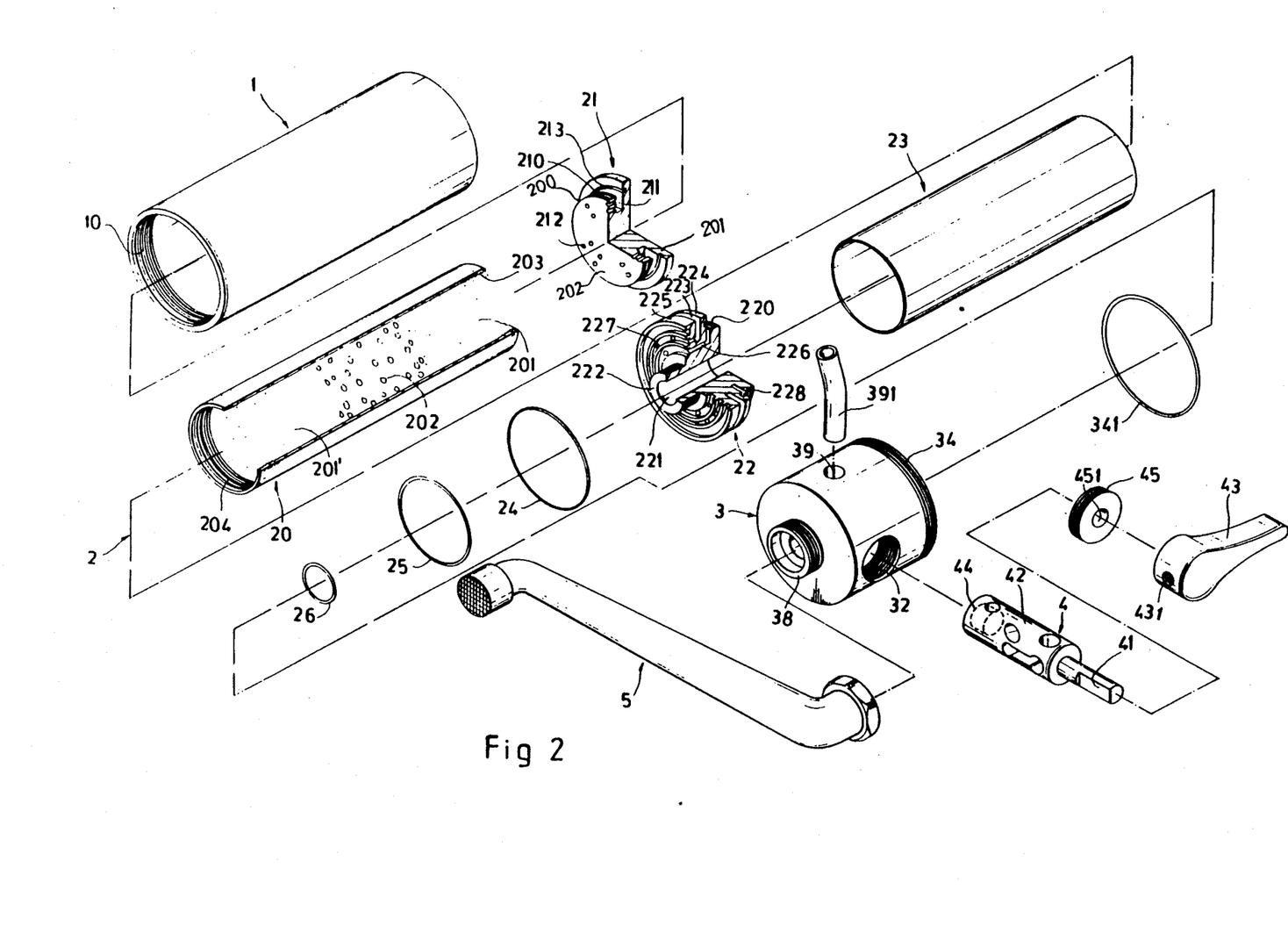
FIG. 2 is an exploded perspective view thereof

Referring to FIGS. 1 and 2, a water filter is comprised of a casing 1 mounted on a base 3 to hold a filter assembly 2 therein. The casing 1 is made in a cylindrical shape having one end closed and an opposite end opened. The casing 1 has an inner thread 10 on the opened end thereof by which it can be fastened to the base 3 through a screw joint. The filter assembly 2 is comprised of an inner filter tube 20, a top end cap 21 fastened in said inner filter tube 20 at a top end thereof, a bottom end cap 22 fastened in said inner filter tube 20 at a bottom end thereof, and an outer filter tube 23 sleeved on said inner tube 20 and retained between said top and bottom end caps 21, 22. The inner filter tube 20 has two inner threads 203, 204 at two opposite ends and is stuffed with sponges 201, 201' and active carbons 202. The top and bottom end caps 21, 22 each has an outer thread 210 or 220 being respectively in mesh with the inner threads 203, 204 of the inner filter tube 20. The top end cap 21 is made from a cylindrical, stepped block comprised of a body portion 200 extending from a head portion 201, wherein the outer diameter of said head portion 201 is relatively larger than that of said body portion 200. An outer thread 210 and an annular groove 211 are made on the peripheral surface of the body portion 200. A plurality of water outlet holes 212 are made on a bottom edge 202 of the body portion 200 respectively communicated to the annular groove 211. The head portion 201 has an annular groove 213 on a bottom edge thereof adjacent to the body portion 200. The bottom end cap 22 is made from a stepped block consisted of three parts, namely, a narrower part at an opposite end made with an outer thread 220 around part at an opposite end made with an outer thread 220 around the peripheral surface thereof, and a widest part at the middle formed into an upper ring 224 and a lower ring 225 divided by an annlar groove 223. Two ring-shaped water passage ways 2216 227 are concentrically made on the lower ring 225, wherein the inner ring-shaped water passage way 226 passes through the annular groove 223 and turns outwards through the outer thread 220; the outer ring-shaped water passage way 227 communicates to the annular groove 223. The bottom end cap 22 further comprises a through hole 221 through the central axis thereof, namely, through the central axis of the hollow screw rod 222. The through hole 221 is served as a water outlet hole for discharging a filtrated flow of water. Three water seal rings 24, 25, 26 are respectively mounted on the lower ring 225 on a bottom edge thereof, wherein the largest water seal ring 24 is disposed around the outer ring-shaped water passage way 227, the medium water seal ring 25 is disposed between the outer and inner ring-shaped water passage ways 227, 226, and the smallest water seal ring 26 is disposed around the hollow screw rod 222. The upper ring 224 has an annular groove 228 corresponding to the annular groove 213 on the top end cap 21. The outer filter tube 23 is made from a fiber cloth suitable for filtering water and sleeved on the inner filter tube 20. Once the outer filter tube 23 is sleeved on the inner filter tube 20, its two opposite ends are respectively inserted into the annular grooves 213, 228 of the top and bottom end caps 21, 22 while the outer threads 210, 220 of the top and bottom end caps 21, 22 are respectively screwed into the inner threads 203, 204 of the inner filter tube 20.

Figure 3:
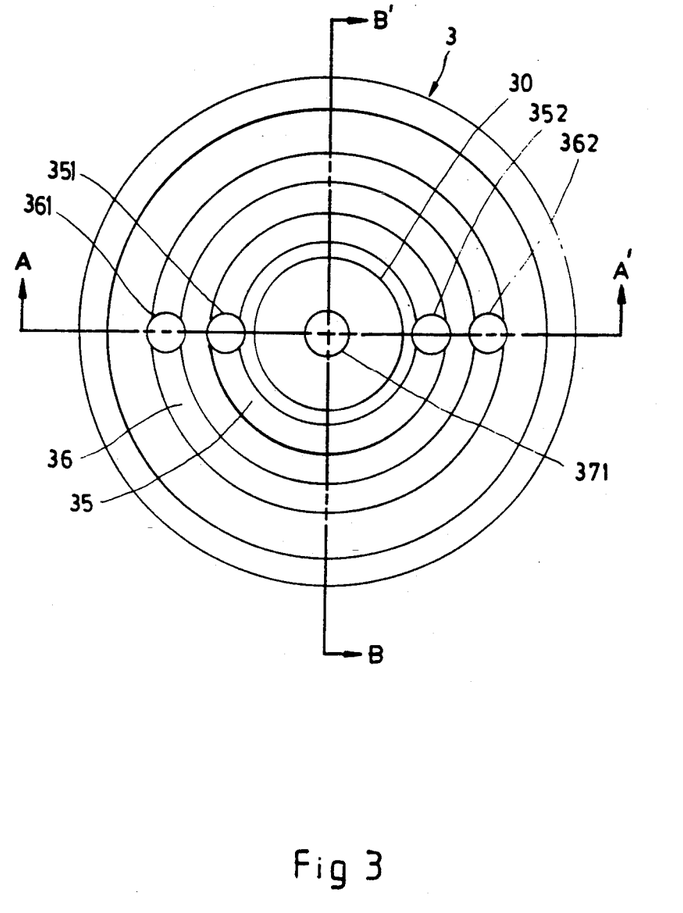
FIG. 3 is a bottom view of the base thereof.
Figure 4:
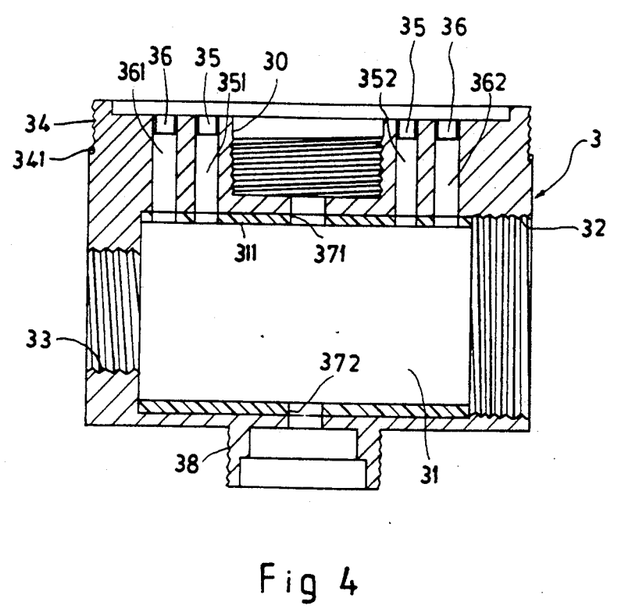
FIG. 4 is a sectional view taken on FIG. 3 along line A—A'.
Figure 5:
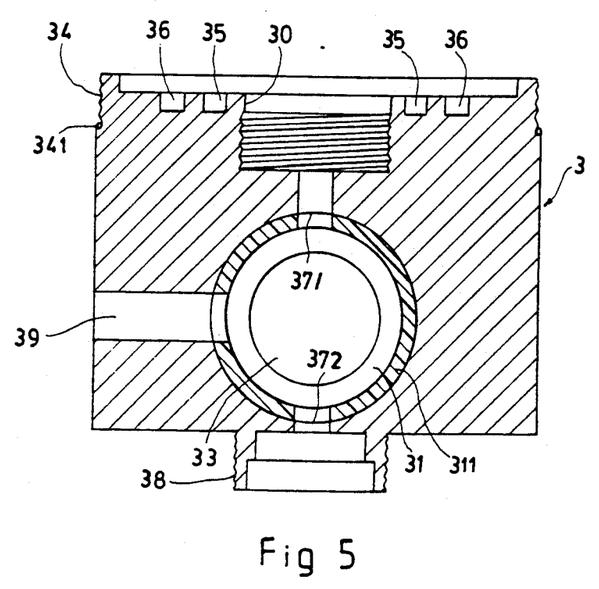
FIG. 5 is a sectional view taken on FIG. 3 along line B—B'.
Figure 6:
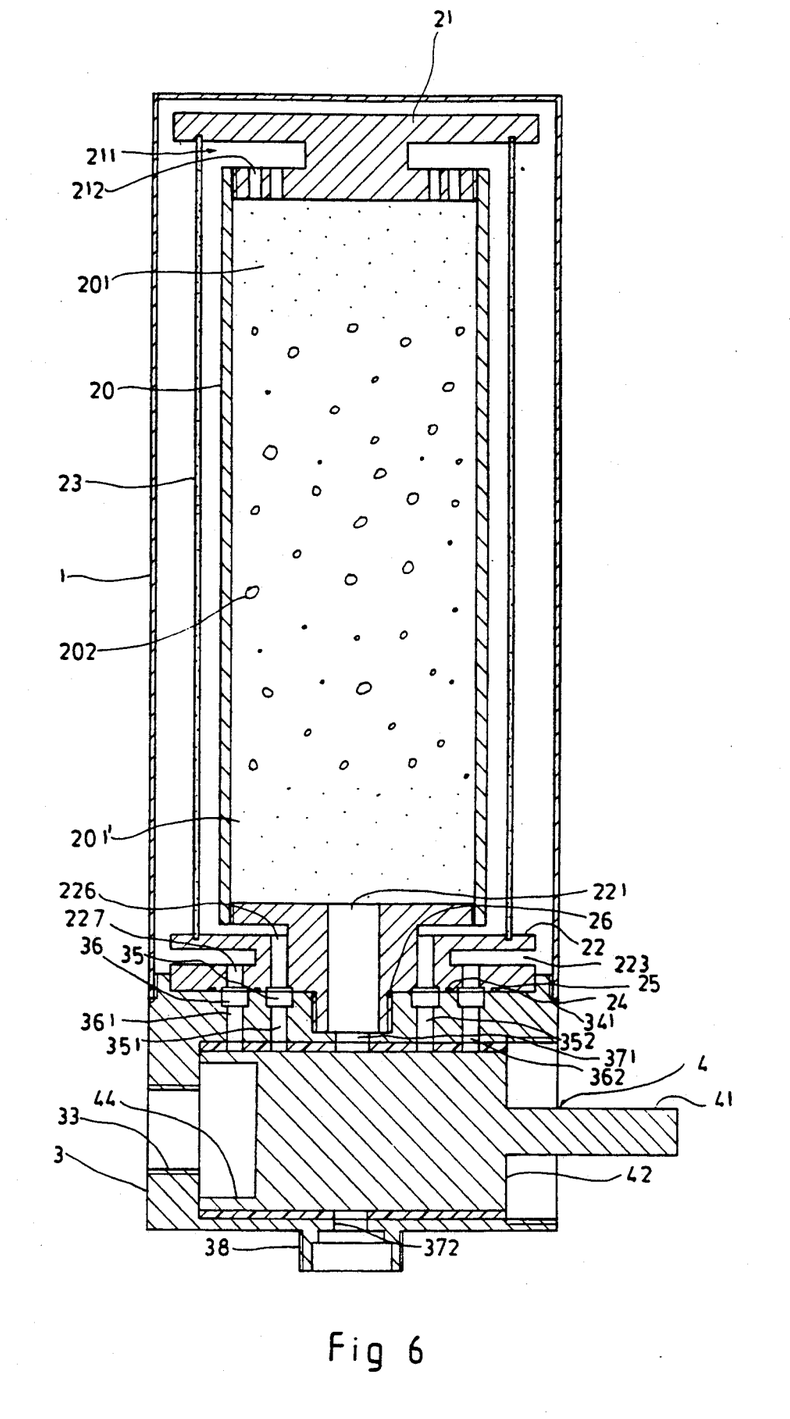
FIG. 6 is a side sectional view of the water filter showing that the water filter is turned to the "STOP" mode.
Figure 7:
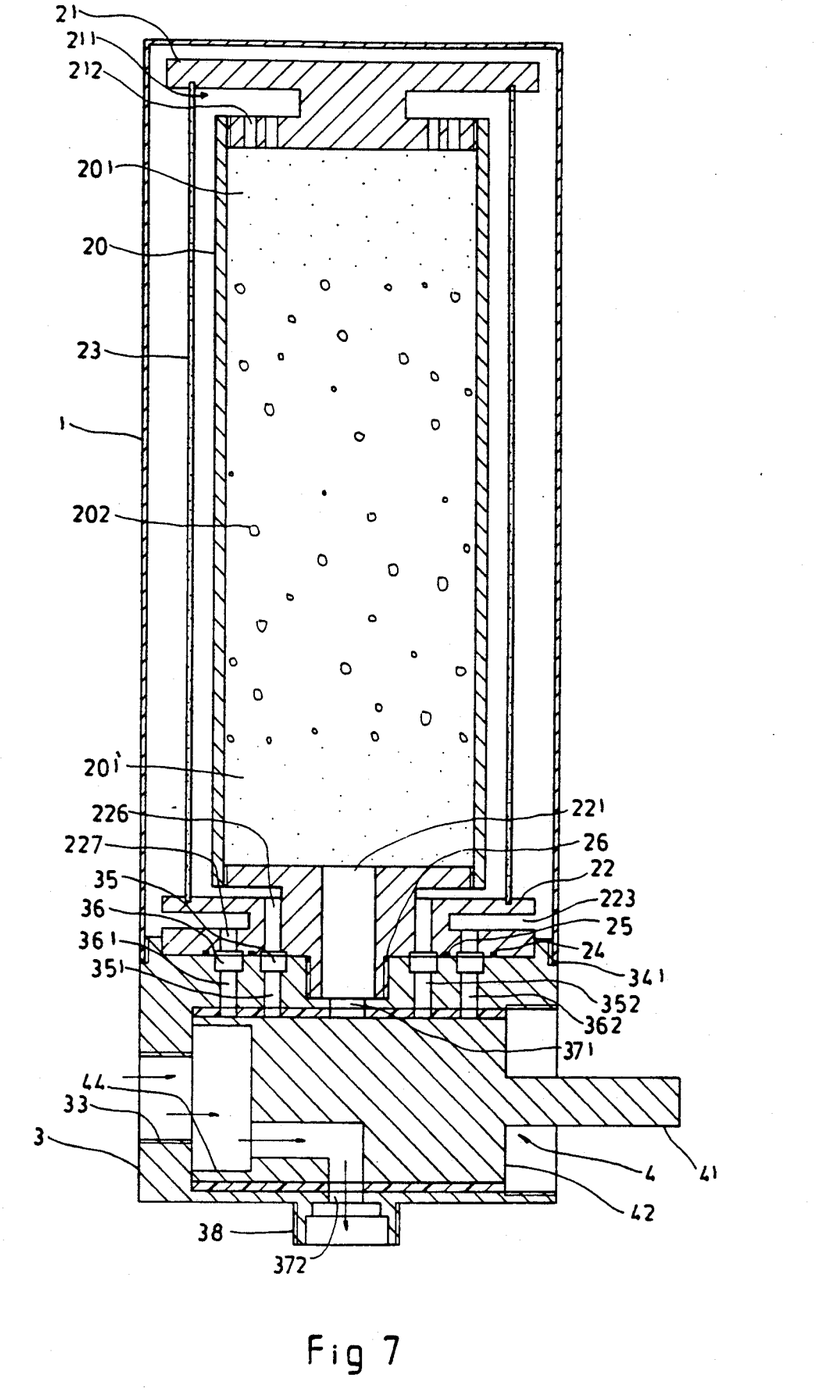
FIG. 7 is another side sectional view of the water filter showing that the water filter is turned to the "CRUDE WATER" mode.
Figure 8:
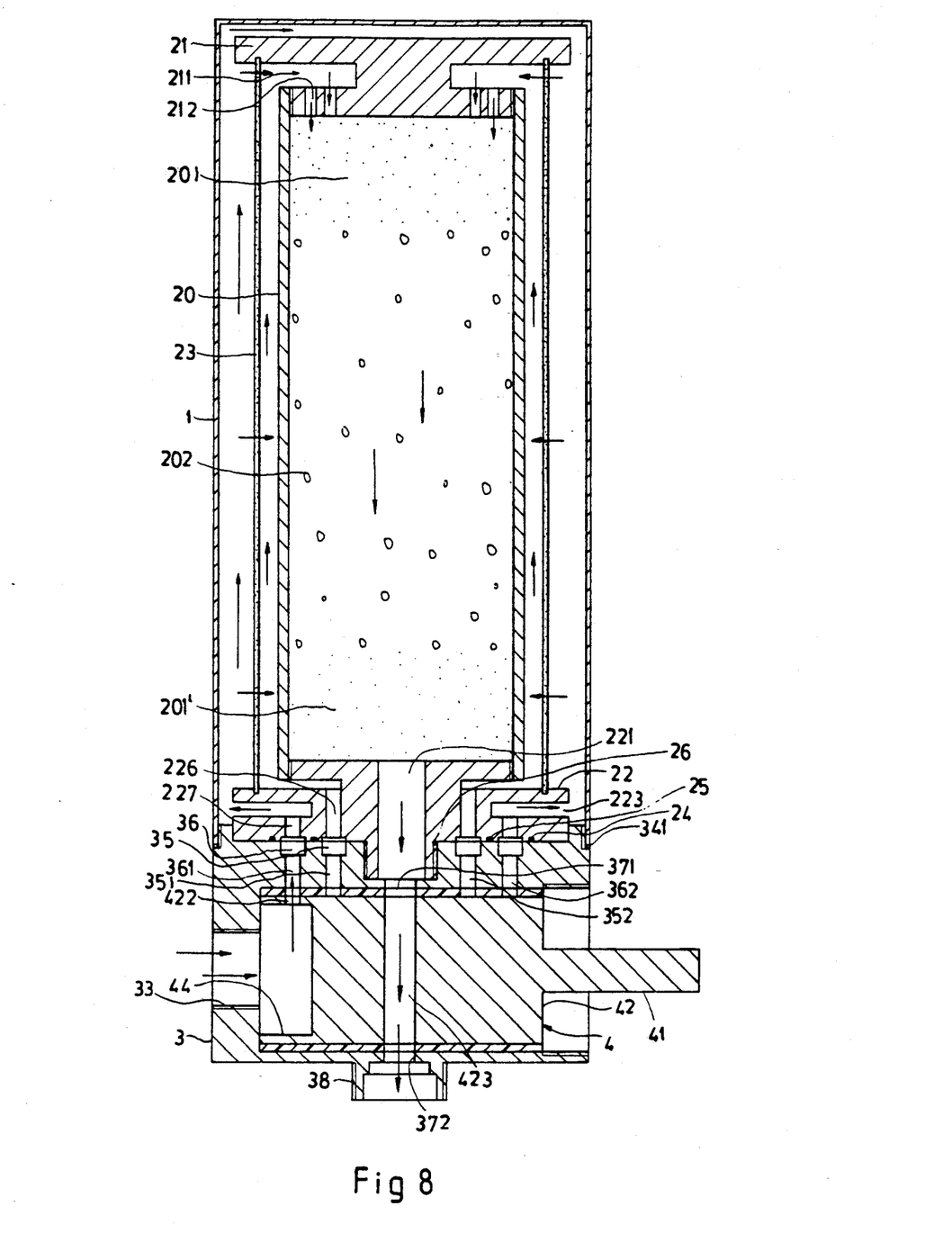
FIG. 8 is still another side sectional view of the water filter showing that the water filter is turned to the "FILTRATION" mode.

Referring to FIG. 3, 4 and 5 and seeing FIG. 2 again, the base 3 is made in a cylindrical shape having a first bolt hole 30 longitudinally disposed on the top edge thereof and disposed in mesh with the hollow screw rod 222 of the bottom end cap 22, a cylindrical hole 31 transversely disposed at the inside and attached with a rubber tube 311 for holding a plunger 4, a second bolt hole 32 on the peripheral surface thereof disposed at one end of the cylindrical hole 31 and screwed up with a ring-shaped element 45, which ring-shaped element 45 has a round hole 451 at the center and is to stop the plunger 4 from moving out of the base 3, a third bolt hole 33 on the peripheral surface thereof disposed at an opposite end of the cylindrical hole 31 and connected to a water supply pipe (not shown), an outer thread 34 on the peripheral surface thereof at one end and disposed in mesh with the inner thread 10 on the casing 1, an inner annular groove 35 and an outer annular groove 36 on the top edge thereof corresponding to the inner and outer ring-shaped water passage ways 226, 227 on the bottom end cap 22, two water inlet holes 351, 361 and two water outlet holes 352, 362 respectively made on the two annular grooves 35, 36 and communicated to the cylindrical hole 31, an upper water passage way 371 and a lower water passage way 372 vertically disposed at two opposite locations, a hollow screw rod 38 extending from the bottom edge thereof for connecting an outlet pipe 5 and communicated to the cylindrical hole 31 via the lower water passage way 372, a drin hole 39 on the peripheral wall surface thereof at right angle relative to the cylindrical hole 31, and a drain pipe 391 connected to the drain hole 39. The plunger 4 comprises a cylindrical body 42 set inside the cylindrical hole 31, and an elongated rod 41 extending from the cylindrical body 42 and projected out of the ring-shaped element 45 through the round hole 451 for connecting a lever 43, wherein the cylindrical body 42 has a recessed water chamber 44 on an end edge thereof and a plurality of water passage holes thereon (the water passage holes will be described further). The lever 43 has a mounting hole (not shown) for inserting the elongated rod 41, and a bolt hole 431 at right angle for fastening a lock screw (not shown) to firmly secure the lever 43 to the elongated rod 41. When the outer thread 34 and the inner thread 10 are in mesh, a water seal ring 341 is firmly retained in between the casing 1 and the base 3 to seal up the gap therebetween.

Referring to FIGS. 6, 7, 8, 9 and 10 and seeing FIG. 3 again, rotating the lever 43 causes the plunger 4 to rotate in the cylindrical hole 31 for controlling five operational modes (functions) which include "STOP", "FILTRATION", "CRUDE WATER", "BACKWASHING", and "RINSING". These modes are respectively outlined hereinafter.

1. When the lever 43 is rotated to the "STOP" mode to stop the supply of water, the water passage holes on the cylindrical body 42 of the plunger 4 are sealed by the rubber tube 311, and therefore, the flow of water which is guided from a water supply into the third bolt hole 33 is stopped at the third bolt hole 33 by the plunger 4 (see FIG. 6).

2. When the lever 43 is rotated to the "CRUDE WATER" mode, a first water passage hole 421 on the cylindrical body 42 of the plunger 4 is aligned with the lower water passage way 372, permitting the flow of water which is guided from a water supply into the third bolt hole 33 to directly discharge out of the hollow screw rod 38 (see FIG. 7).

3. When the lever 43 is rotated to the "FILTRATION" mode, the flow of water which is guided from a water supply into the third bolt hole 33 flows through the recessed water chamber 44, a second water passage hole 422 on the cylindrical body 42 of the plunger 4, the water inlet hole 361 into the outer annular groove 36 (see FIG. 3), then, flows from the outer annular groove 36 through the outer ring-shaped water passage way 227 and the annular groove 223 into the space between the casing 1 and the outer filter tube 23. The flow of water which is accumulated in the space between the casing 1 and the outer filter tube 23 immediately penetrates through the outer filter tube 23 and flows into the inner filter tube 20 via the annular groove 211 and the water outlet holes 212. While passing through the inner filter tube 20, the flow of water is filtrated by the sponges 201, 201' and the active carbons 202. After filtration through the inner filter tube 20, the flow of water immediately flows through the through hole 221, the upper water passage way 371 and a third water passage hole 423 on the cylindrical body 42 of the plunger 4 into the hollow screw rod 38 via the lower water passage way 372 (see FIG. 8).

Figure 9:
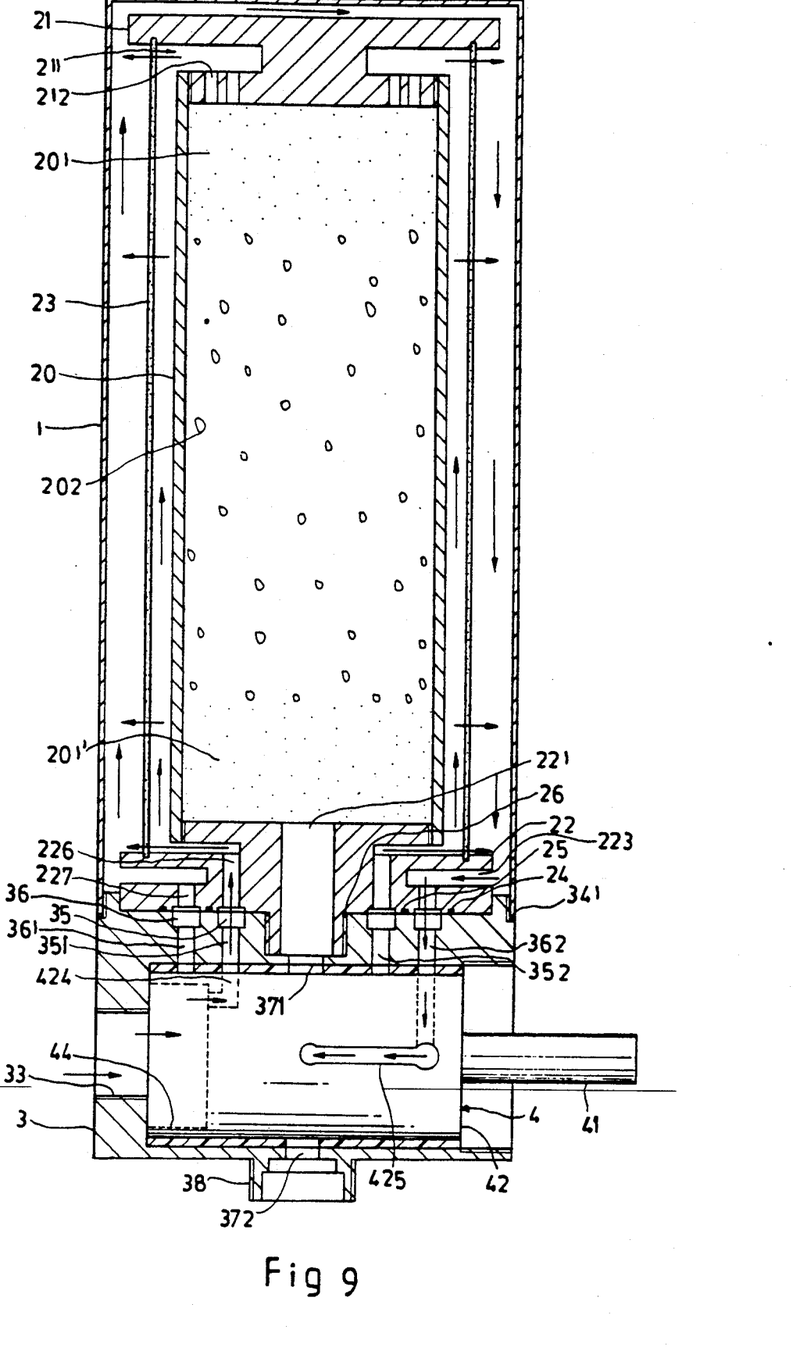
FIG. 9 is still another side sectional view of the water filter showing that the water filter is turned to the "BACKWASHING" mode.

4. When the lever 43 is rotated to the "BACKWASHING" mode, as shown in FIG. 9, the flow of water which is guided from a water supply into the third bolt hole 33 flows through the recessed water chamber 44, a fourth water passage hole 424 on the cylindrical body 42 of the plunger 4 and the water inlet hole 351 into the inner annular groove 35 (see FIG. 3), then, flows from the inner annular groove 35 through the inner ring-shaped water passage way 226 into the space between the inner filter tube 20 and the outer filter tube 23. The flow of water which is accumulated in the space between the inner filter tube 20 and the outer filter tube 23 immediately penetrates through the outer filter tube 23 to carry impurities out of the meshes on the outer filter tube 23. Because the upper water passage way 371 is blocked by the cylindrical body 42 of the plunger 4, the flow of water is forced to flow through the annular groove 223, the outer ring-shaped water passage way 227, the outer annular groove 36 and the outlet hole 362 into a fifth water passage hole 425 on the cylindrical body 42 of the plunger 4. Because the fifth water passage hole 425 is aligned with the drain hole 39 (see FIG. 5), the flow of water is guided from the fifth water passage hole 425 into the drain hole 39 to drain away through the drain pipe 391.

Figure 10:
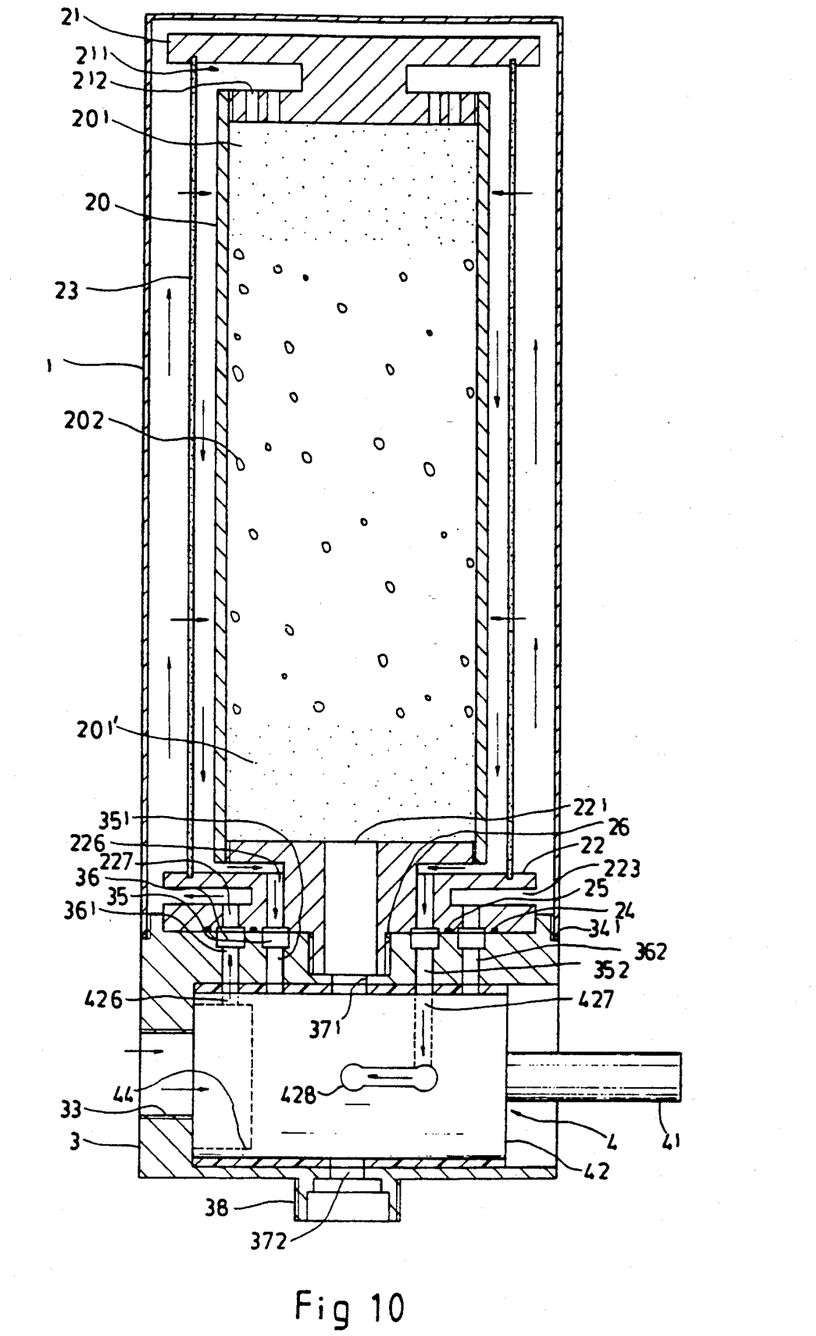
FIG. 10 is still another side sectional view of the water filter showing that the water filter is turned to the "RINSING" mode.

5. When the lever 43 is rotated to the "RINSING" mode, as shown in FIG. 10, the flow of water which is guided from a water supply into the third bolt hole 33 flows through the recessed water chamber 44, a six water passage hole 426 on the cylindrical body 42 of the plunger 4 and the water inlet hole 361 into the outer annular groove 36, then, flows from the outer annular groove 36 through the outer ring-shaped water passage way 227 into the space between the outer filter tube 23 and the casing 1. The flow of water which is accumulated in the space between the outer filter tube 23 and the casing 1 immediately penetrates through the outer filter tube 23 to carry impurities out of the meshes on the outer filter tube 23 and flows through the inner water passage way 226, the inner annular groove 35, the water outlet hole 352 and a seventh water pasage hole 427 and an eighth water passage hole 428 on the cylindrical body 42 of the plunger 4 into the drain hole 39 and the drain pipe 391 for drawing away. Therefore, the outer filter tube 23 is washed from the inside when the lever 43 is rotated to the "RINSING" mode, or washed from the outside when the lever 43 is rotated to the "BACKWASHING" mode.

I claim:

1. A water filter, comprising:

a hollow, cylindrical base, said base comprising a cylindrical hole transversely disposed at the inside, an outer thread at the top, a water intake port aligned with said cylindrical hole at one end and connected to a water supply through a water intake pipe, an inner annular groove and an outer annular groove concentrically disposed on said top edge, two water inlet holes and two water outlet holes respectively made on said inner annular groove and said outer annular groove and communicated to said cylindrical hole, an upper water passage way and a lower water passage way vertically disposed at two opposite locations, a water outlet port attached with a water outlet pipe and communicated to said cylindrical hole through said lower water passage way, and a drain port vertical to said cylindrical hole and attached with a drain pipe;

a casing attached to said base at the top, said casing having one end opened and an opposite end closed, the opened end of said casing having an inner thread being in mesh with the outer thread on said base;

a filter assembly held inside said casing, said filter assembly consisted of inner filter tube and an outer filter tube, said inner filter tube being made from a solid tube stuffed with sponges and active carbons and having two opposite ends sealed with a top end cap and a bottom end cap respectively, said outer filter tube being made from a braided fiber cloth sleeved on said inner filter and retained between said two end caps;

a plunger fastened in said cylindrical hole of said base and rotated by a lever, said plunger comprising an elongated rod extending from a cylindrical body, said elongated rod being extended out of said base and coupled with said lever, said cylindrical body having a recessed water chamber at one end disposed adjacent to said water intake port and a plurality of water passage holes separately communicated to said recessed water chamber; and wherein rotating said lever causes said plunger to guide an intake flow of water to (a) flow toward said water outlet pipe directly; (b) flow through said filter assembly to said water outlet pipe; (c) flow through the space between said inner filter tube and said outer filter tube and then, penetrate through said outer filter tube toward said drain pipe; (d) flow into the space between said outer filter tube and said cylindrical casing and penetrate through said outer filter tube and then, flow toward said drain pipe; or (e) be stopped from flowing through said base.

2. The water filter of claim 1, wherein said top end cap is made from a cylindrical, stepped block comprised of a narrower body portion extending from a wider head portion, said body portion having an annular groove around a peripheral surface thereof adjacent to said head portion and a plurality of water passage holes on a bottom edge thereof respectively communicated to the annular groove thereof for passing a flow of water.

3. The water filter of claim 1, wherein said bottom end cap is made from a stepped block comprising a first connecting end at one end connected to said base, a second connecting end at an opposite end connected to said inner filter tube, a circular flange at the middle divided into an upper ring and a lower ring by an annular groove, and a through hole through the central axis thereof and connected between said inner filter tube and said upper water passage way of said base, said lower ring comprising two concentric, ring-shaped water passage ways, said two concentric, ring-shaped water passage ways including an inner ring-shaped water passage way passing through said upper ring, and an outer ring-shaped water passage way communicated to the annular groove between said upper and lower rings.

4. The water filter of claim 1, wherein said inner annular groove and said outer annular groove are respectively disposed at locations corresponding to said inner ring-shaped water passage way and said outer ring-shaped water passage way of said bottom end cap.

* * * * *